US009799178B2

(12) United States Patent
Mason et al.

(10) Patent No.: US 9,799,178 B2
(45) Date of Patent: Oct. 24, 2017

(54) SYSTEMS, APPARATUS AND METHODS FOR PRODUCING AN OUTPUT, E.G. LIGHT, ASSOCIATED WITH AN APPLIANCE, BASED ON APPLIANCE SOUND

(71) Applicant: KONINKLIJKE PHILIPS N.V., Eindhoven (NL)

(72) Inventors: Jonathan David Mason, Eindhoven (NL); Dzmitry Viktorovich Aliakseyeu, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/358,057

(22) PCT Filed: Nov. 14, 2012

(86) PCT No.: PCT/IB2012/056414

§ 371 (c)(1),
(2) Date: May 14, 2014

(87) PCT Pub. No.: WO2013/072858

PCT Pub. Date: May 23, 2013

(65) Prior Publication Data

US 2014/0313006 A1 Oct. 23, 2014

Related U.S. Application Data

(60) Provisional application No. 61/560,958, filed on Nov. 17, 2011.

(51) Int. Cl.

| | |
|---|---|
| ***H04B 1/20*** | (2006.01) |
| ***G08B 7/06*** | (2006.01) |
| ***H05B 37/02*** | (2006.01) |

(52) U.S. Cl.
CPC ............... *G08B 7/06* (2013.01); *H05B 37/02* (2013.01); *H05B 37/0227* (2013.01)

(58) Field of Classification Search
CPC ............................ H05B 37/0227; G08B 37/02
(Continued)

(56) References Cited

U.S. PATENT DOCUMENTS 4,261,563 A * 4/1981 Goldfarb ............... A63F 9/0096 273/445
4,860,317 A * 8/1989 Tomlinson ....... G11B 20/10194 375/285
(Continued)

FOREIGN PATENT DOCUMENTS

JP 2010249349 A 11/2010
WO 0232123 A2 4/2002
(Continued)

*Primary Examiner* — Hai Phan
*Assistant Examiner* — Royit Yu

(57) ABSTRACT

The present disclosure is directed to systems (200), apparatus and methods utilizing the soundscape of the appliance (204) to generate content for a dynamic output. In various embodiments, the output generated by the apparatus is varied based on differences in the acoustic signal resulting from changes in the operating state of the appliance (204). By utilizing the soundscape of the appliance (204), a non-repetitive and pseudo-random, but still recognizable outputs associated with the appliance (204), can be generated based on the various operating states of the appliance (204). The user's operation of the appliance (204) may influence the acoustic signal received by the apparatus which may further influence the output produced by the appliance (204). The systems (200), apparatus and methods described herein employ a dynamic acoustic signal of an appliance (204) to provide a user with a dynamic output to engage the user in a manner that increases their interest in and attachment to the appliance (204).

28 Claims, 6 Drawing Sheets

(58) Field of Classification Search
USPC .................................................... 340/4.4–6.1
See application file for complete search history.

(56) References Cited

U.S. PATENT DOCUMENTS

| | | | | |
|---|---|---|---|---|
| 4,869,233 | A | 9/1989 | Stulen | |
| 5,056,399 | A * | 10/1991 | Hornstein | A63J 17/00 340/815.45 |
| 6,236,025 | B1 * | 5/2001 | Berkcan | G05D 23/27535 219/483 |
| 6,270,229 | B1 | 8/2001 | Chien | |
| 6,433,693 | B1 | 8/2002 | Mathews, Jr. | |
| 6,778,226 | B1 * | 8/2004 | Eshelman | H04N 5/64 348/553 |
| 2003/0067391 | A1 * | 4/2003 | Fitzgerald | G08B 21/0208 340/573.1 |
| 2003/0069470 | A1 | 4/2003 | Lee | |
| 2003/0218537 | A1 * | 11/2003 | Hoch | G06F 3/011 340/524 |
| 2007/0260765 | A1 * | 11/2007 | Cooper | A63H 33/22 710/15 |
| 2009/0059589 | A1 * | 3/2009 | Huang | F21S 10/00 362/253 |
| 2010/0027770 | A1 * | 2/2010 | Park | H04B 11/00 379/106.01 |
| 2010/0066554 | A1 * | 3/2010 | Lee | D06F 39/00 340/679 |
| 2010/0188324 | A1 | 7/2010 | Ohashi et al. | |
| 2010/0259377 | A1 * | 10/2010 | Cho | H04L 12/2825 340/531 |
| 2011/0037606 | A1 | 2/2011 | Boise | |
| 2011/0074589 | A1 * | 3/2011 | Han | H04L 12/2825 340/618 |
| 2011/0137657 | A1 | 6/2011 | Cenedese | |
| 2011/0202396 | A1 | 8/2011 | Viveiros et al. | |
| 2012/0239762 | A1 * | 9/2012 | Fisher | H04N 21/4108 709/206 |
| 2012/0315821 | A1 * | 12/2012 | Hayakawa | A63F 13/02 446/297 |
| 2013/0084369 | A1 * | 4/2013 | Smrke | G05D 23/27535 426/231 |
| 2013/0106709 | A1 * | 5/2013 | Simmons | G06F 3/044 345/173 |

FOREIGN PATENT DOCUMENTS

| | | | |
|---|---|---|---|
| WO | 2004049767 | A1 | 6/2004 |
| WO | 2011007325 | A1 | 1/2011 |
| WO | 2011069695 | A1 | 6/2011 |

* cited by examiner

SYSTEMS, APPARATUS AND METHODS FOR PRODUCING AN OUTPUT, E.G. LIGHT, ASSOCIATED WITH AN APPLIANCE, BASED ON APPLIANCE SOUND

This application is the U.S. National Phase application under 35 U.S.C. §371 of International Application No. PCT/IB2012/056414, filed on Nov. 14, 2012, which claims the benefit of U.S. Provisional Application No. 61/560,958 filed on Nov. 17, 2011. These applications are hereby incorporated by reference herein.

TECHNICAL FIELD

The present invention is directed generally to systems, apparatus and methods for producing an output associated with an appliance. More particularly, various inventive methods and apparatus disclosed herein relate to using the soundscape of an appliance to produce a multi-modal output.

BACKGROUND

Products with a dynamic output are often more appreciated by users than static devices because the dynamic output provides an additional source of interest. For example, dynamic outputs can be provided on smart phones or personal computers through use of interactive screensavers or wallpapers. Other examples include ambient lighting technology used in televisions, dynamic lighting in artificial fireplaces or candles, interactive displays in public places like galleries or museums.

Typically, the content used to drive a dynamic output must be created and updated to prevent users from becoming bored by the output produced by the appliance. The need to create content that constantly changes prevents appliance manufactures from implementing such features.

Known approaches to creating content to drive a dynamic output include random or pseudo-random output generation. A problem with these methods is that they generally are based on algorithms that may be mathematically complex and may require additional computational power. One example of such algorithm is the Markov algorithm used to control light. In addition, these algorithms require suitable content to drive the algorithm to produce the dynamic output.

Thus, there is a need in the art to provide systems, apparatus and processes that generate content to drive dynamic outputs for appliances, which result in users becoming more interested in and emotionally attached to their appliances.

SUMMARY

The present disclosure is directed to systems, apparatus and methods described herein that utilize the soundscape of the appliance to generate content for a dynamic output. According to the embodiments described herein, the output generated by the apparatus is varied based on differences in the acoustic signal resulting from changes in the operating state of the appliance. By utilizing the soundscape of the appliance, a non-repetitive, but still recognizable outputs associated with the appliance, can be generated based on the various operating states of the appliance. Furthermore, the user's operation of the appliance may influence the acoustic signal received by the apparatus which may further influence the output produced by the appliance. The systems, apparatus and methods described herein employ a dynamic acoustic signal of an appliance to provide a user with a dynamic output to engage the user in a manner that increases their interest in and attachment to the appliance.

Generally, in one aspect, the invention relates to a system associated with an appliance. The system includes an acoustic sensor associated with the appliance for receiving an acoustic signal produced by the appliance during operation thereof and generating an associated output signal. The system also includes an output element configured to generate an output in an environment associated with the appliance. The system further includes a controller coupled to the acoustic sensor and the output element. The controller is configured to receive the associated output signal and control the output element to provide the output based on the associated output signal. In some embodiments, the output can include a multi-modal and pseudo-random output. The output can include at least one of light, sound, and vibration.

According to various embodiments, the controller is configured to control the output element to provide a varied output based on differences in at least one of how the appliance is used and an operating condition of the appliance. In some embodiments, the output element is configured to provide a pseudo-random decorative output in the environment associated with the appliance.

In at least one embodiment, the output element is disposed apart from the appliance. The output element can be integrated into at least one of a system that provides ambient lighting in the environment associated with the appliance, a system that provides decorative lighting in the environment associated with the appliance and an audio system that provides a set of sound signals audible in the environment associated with the appliance.

In some embodiments, the output element includes a lighting network configured to produce a lighting effect perceivable in the environment. The controller can be further configured to control at least one of intensity, duration, color, and timing of the lighting effect based on the associated output signal. In at least one embodiment, the controller is further configured to control the lighting network to provide the lighting effect based on a characteristic of the associated output signal including at least one of a frequency of the associated output signal, a sound pressure level of the associated output signal, a relative change of the sound pressure level, a deviation of the associated output signal, and acoustic patterns associated with the appliance.

In another aspect, the invention relates to a household appliance that includes at least one output element which may be included in the household appliance, each of the at least one output element configured to generate an output in an environment associated with the household appliance. The household appliance also includes an acoustic sensor configured to receive an acoustic signal produced by the household appliance during an operation of the household appliance and configured to generate an associated output signal. The household appliance further includes a controller coupled to the acoustic sensor and to the at least one output element and configured to receive the associated output signal and control the at least one output element to provide the output based on the associated output signal.

According to various embodiments, the controller is configured to control the at least one output element to provide a varied output based on differences in at least one of how the household appliance is used and an operating condition of the household appliance. Further, the output can include a pseudo-random and multi-modal output.

In some embodiments, the at least one output element is disposed apart from the household appliance. The controller can be configured to communicate with the at least one output element disposed apart from the household appliance. In at least one embodiment, the at least one output element disposed apart from the household appliance is integrated into at least one of a system that provides ambient lighting in the environment associated with the household appliance, a system that provides decorative lighting in the environment associated with the household appliance and an audio system that is audible in the environment associated with the household appliance.

In another aspect, the invention generally contemplates a method of producing an output associated with an appliance. The method includes an act of receiving an acoustic signal produced by the appliance, the acoustic signal corresponding to an operating state of the appliance. The method also includes the act of controlling an output element to provide an output based on the received acoustic signal, the output generated in an environment associated with the appliance. The method further includes the act of varying the output based on differences in the acoustic signal resulting from a change in the operating state of the appliance.

In one embodiment, the act of receiving the acoustic signal further includes the acts of receiving a first acoustic signal corresponding to a first operating state of the appliance and receiving a second acoustic signal corresponding to a second operating state of the appliance, the second operating state being different than the first operating state.

In some embodiments, the act of controlling the output element further includes the acts of controlling the output element to provide a first output corresponding to the first operating state of the appliance and controlling the output element to provide a second output based on the second acoustic signal corresponding to the second operating state of the appliance, wherein the second output is different than the first output. In one embodiment, the change from the first operating state to the second operating state occurs independent of a user's operation of the appliance. In another embodiment, the change in the operating state from the first operating state to the second operating state results from a user operating the appliance.

In at least one embodiment, the act of varying the output based on differences in the acoustic signal further includes the act of varying the output based on differences in the acoustic signal to provide a pseudo-random output. In the method, the act of controlling the output element to provide the output further includes the act of controlling the output element to provide feedback to a user in the environment associated with the appliance, wherein the feedback to the user results in the user operating the appliance to change the operating state of the appliance.

As used herein for purposes of the present disclosure, the term "acoustic sensor" should be understood to include any sensors or transducers that convert sound into an electrical signal, including, but not limited to, microphones, piezoelectric vibration/acceleration sensors, fiber optic sensors, semiconductor acceleration sensors and micro-electro-mechanical systems (MEMS).

As used herein for purposes of the present disclosure, the term "operating state" should be understood to include any state, condition or mode of operation of any appliance. It should be apparent that a general operating state such as an "on" or "off" state can include variability within it. For example, an off state can include a standby mode, power-saving sleep mode or a complete power-off mode, while an on-state can include ranges in operating speed, temperature and/or intensity or other variables alone or in combination with each other or the preceding variables. The operating states can result from settings selected by a user operating the appliance, phases associated with a medium associated with the appliance or combinations of the preceding and other variables. It is appreciated that the appliance may have multiple operating states, some of which can be specific to the type of appliance. Furthermore, the operating states can occur concurrently or sequentially, and can change independent of a user's behavior or as a result of the user's behavior. Some other examples of operating states include, but are not limited to a heating or a boiling phase of water in a kettle or a coffee maker, mixing phases or settings of a food processor, operating states of an heating, cooling and air-conditioning system depending on the number of users in a shared space. It also should be appreciated that the terms "operation," "condition," "mode" "phase," or "stage" may be used in connection with the term "operating state."

As used herein, "perceivable" refers to an output effect that is noticeable to a human. It should be apparent that perceivable output effects can be perceived by at least one sense including any of visual, auditory, tactile, and/or olfactory as some examples.

As used herein, "appliance" refers to all varieties of household appliances including but not limited to kitchen appliances, cleaning appliances, bathroom appliances and outdoor appliances (for example, grills or power tools). However, it should be appreciated that as used herein, "appliance" can refer to an apparatus or device having a particular purpose whether located in a residence or in a public space, or a private space including an office space, a commercial facility or an industrial facility.

As used herein for purposes of the present disclosure, the term "soundscape" should be understood to include any acoustic signal associated with the appliance produced during an operational state of the appliance, including, but not limited to, acoustic signals produced by the appliance itself, acoustic signals produced as result of a user interacting with the appliance or a combination of the preceding acoustic signals produced by the operating state of the appliance. It should be apparent that the acoustic signals may be generated only internal to the appliance, only external to the appliance or a combination of the two. Further, acoustic signals can include ambient sounds that change with a changed operating state of the appliance. Some examples of acoustic signals include, but are not limited to, sounds produced by the coil elements in a toaster as they are energized and heated, sounds produced by a lever as a user operates it to lower a piece of toast into the toaster and may include sounds specific to the amount of pressure applied to the lever by the user and/or the rate at which the lever is moved, and sounds produced by the boiling operating state in a kettle and may include boiling sounds specific to the amount of water in the kettle.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs.

The term “lighting fixture” is used herein to refer to an implementation or arrangement of one or more lighting units in a particular form factor, assembly, or package. The term “lighting unit” is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An “LED-based lighting unit” refers to a lighting unit that includes one or more LED-based light sources as discussed above, alone or in combination with other non LED-based light sources.

The term “controller” is used herein generally to describe various apparatus relating to the operation of the appliances described herein. A controller can be implemented in numerous ways (e.g., such as with dedicated hardware) to perform various functions discussed herein. A “processor” is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as “memory,” e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms “program” or “computer program” are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Generally, Applicants have recognized and appreciated that it would be beneficial to utilize the acoustic signals relating to the soundscape of the appliance to generate various dynamic outputs. Acoustic signals and the associated dynamic outputs can help differentiate appliances, such as vacuum cleaners, food processors, coffee machines, toasters and kettles in a competitive appliance market. Furthermore, the dynamic outputs can allow users to have a more interesting and interactive appliance, further increasing the user’s attachment to and enjoyment of the appliance.

In view of the foregoing, various embodiments and implementations of the present invention are directed to systems, apparatus and processes for producing an output associated with an appliance. In one embodiment, the system includes an acoustic sensor associated with the appliance which receives an acoustic signal produced by the appliance where the acoustic signal can vary dynamically based on the operating state of the appliance. The system further includes a controller that uses the acoustic signal to control an output element to provide a dynamic output, for example, a pseudo-random output, based on features of the acoustic signal. The output is generated in the environment associated with the appliance where it can be perceived by users and others located in the environment.

Figure 1:
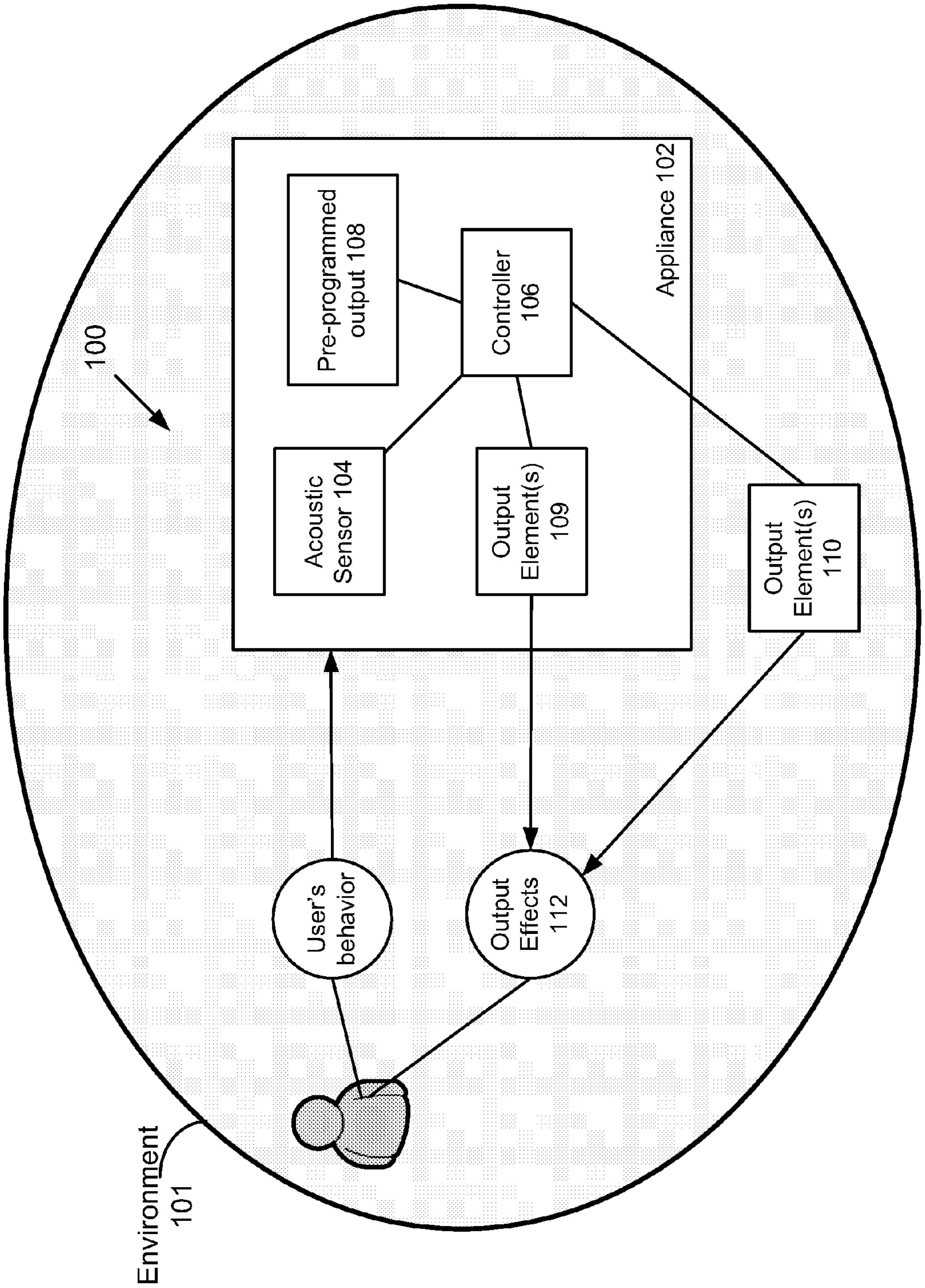
FIG. 1 illustrates a block diagram of an appliance in accordance with one embodiment.

FIG. 1, in one embodiment, illustrates an environment 101 associated with an appliance 102. The environment 101 can include a home environment including one or more rooms or locations in a home such as kitchens, bathrooms, bedrooms, or living rooms. The environment can also include an office or a commercial environment including one or more private, public or shared areas such as private offices, cubicles, conference rooms, kitchens, bathrooms, hallways, or lobby areas. The environment can be an indoor or an outdoor environment, for example an outdoor environment can include a patio, a backyard, or a front yard. The environment 101 can further include industrial facilities such as factory floors, shipping areas, loading docks, or warehouses.

The appliance with which the environment 101 is associated can be a fixture in the environment such as a Heating, Ventilation, and Air conditioning (HVAC) system in an office environment. The appliance can also be a portable device, such as power tools used in an outdoor environment or a vacuum used in different environments in an indoor space. In some embodiments, the appliance is physically located in the environment, such as a toaster in a kitchen. Although all the elements of the system 100 in FIG. 1 are illustrated as being located in the environment 101, embodiments are described herein in which at least a portion of the system 100 is located external to the environment 101. For example, in some embodiments, the environment 101 may not include the appliance 102. In one embodiment, the environment 101 can include an office space and the appliance 102 can instead be located in a kitchen that is adjacent to, but is not included in the office space. As is described in more detail below, an output effect perceivable to occupants of the office space can be dynamically controlled by a soundscape generated by a coffee machine located in the kitchen. For example, decorative lighting effect in the office can indicate that the coffee is ready.

In the embodiment illustrated in FIG. 1 the system 100 can produce one or more output effects perceived by a user located in the environment 101 associated with an appliance 102. In the illustrated embodiment, only one appliance is shown. Although only one appliance is shown, any number of appliances may be used in accordance with various embodiments of the system. The appliance 102 of FIG. 1, in one example, includes an acoustic sensor 104 configured to receive one or more acoustic signals, a controller 106 configured to analyze the acoustic signal, pre-programmed outputs 108 and one or more output elements 109 and 110 configured to produce one or more output effects 112 perceived by the user. The acoustic sensor 104, the controller 106, the pre-programmed outputs 108 and each of the output elements 109 and 110 include one or more inputs and outputs. In the illustrated embodiment, the output of the acoustic sensor 104 is connected to an input of the controller 106 and a first and a second output of the controller 106 are connected to an input of the output element 109 and the output element 110, respectively.

In accordance with the embodiment illustrated in FIG. 1, the acoustic sensor 104 has an input which is configured to receive acoustic signals. The output of the acoustic sensor 104 is electrically coupled to the input of the controller. The pre-programmed outputs 108 have inputs to receive and store programming for one or more predetermined outputs. The output of the pre-programmed outputs 108 is electrically coupled to the input of the controller. The output of the controller 106 is electrically coupled to the inputs of the output elements 109 and 110. The output of the output elements 109 and 110 provides output effects 112 to the user.

Appliance 102 can include any household appliance used for personal use, such as a vacuum cleaner, a coffee maker, a coffee grinder, a toaster oven, a stove, a washing and a drying machine, a food processor, a blender, a mixer, as well as other household appliances. Appliance 102 can further include any office appliance 102 used for business use, such as copy machines, fax machines, telephones, projectors and printers, as well as other office appliances. The appliance 102 can be located in a public or shared space such as a HVAC system located in an office or a retail environment. It is appreciated that the types of appliances described herein and their respective parts or features, are provided merely for illustrative purposes, as numerous other types of appliances can be employed and the system can modified to work with such appliances. In addition, the appliances described herein may have additional parts, outputs or interfaces which could be modified to provide feedback to the user.

Acoustic sensor 104 associated with the appliance 102 may be disposed inside the appliance 102, as shown in the embodiment of FIG. 1, however the acoustic sensor 104 may be disposed apart from the appliance 102, as described further below. Acoustic sensors may be any sensors or transducers that can convert sound into an electrical signal, such as microphones, piezoelectric vibration/acceleration sensors, fiber optic sensors, semiconductor acceleration sensors and micro-electro-mechanical systems (MEMS), as well as other sensor devices. In addition, the appliance 102 may have one or more acoustic sensors, for example, an internal acoustic sensor for detecting acoustic signals internal to the appliance 102 and an external acoustic sensor for detecting acoustic signals external to the appliance 102.

The acoustic signals received by the acoustic sensor 104 may be any acoustic signals associated with the appliance 102 during operation of the appliance 102. In one embodiment, acoustic signals are produced by the appliance 102. In some embodiments, these acoustic signals are completely internal to the appliance. For example, such acoustic signals can be the sounds produced by the coil elements in a toaster as the elements are energized and heated, or the sounds produced by a coffee machine as it heats up water. Some of these signals may be produced independent of a user's operation of the appliance 102. In accordance with one embodiment, the acoustic signals are audible to the user while in other embodiments the acoustic signals are inaudible to the user.

In another embodiment, the acoustic signals are those produced as a result of a user interacting with the appliance 102 and may be influenced by the user's behavior. For example, the user may operate the appliance 102 by physically manipulating parts of the appliance 102 thereby producing acoustic signals received by the acoustic sensor. These acoustic signals may be completely internal to the appliance. For example, acoustic signals may be sounds produced by the toaster as the user drops a piece of bread into the toaster, sounds produced by a handle on the toaster as the user operates the handle to lower the piece of bread into the toaster, or sounds produced by a dial on the toaster as the user turns the dial to select a toasting setting.

The sound may vary from user to user, from appliance to appliance and from operation to operation. For example, different users can operate the toaster handle with different amounts of force (e.g. gently or violently) producing varying sounds. In another example, the same user can operate the handle differently at each operation. The user's operation can vary based on factors that are either conscious or unconscious to the user. It should be apparent that a user's behavior may be specific to the particular appliance 102 based on parts of the appliance 102, how the appliance is operated by the users and/or specific to the operation of the appliance 102. For example, how a first user interacts and operates a toaster and the acoustic signals produced as a result of that interaction differs from how a second user may interact with the toaster and the resulting acoustic signal. Similarly, how the first user interacts with the toaster is different than how the first user may interact with a HVAC system and the acoustic signals produces as the result.

Different users can have individual soundscapes associated with each user based on that user's operation of the appliance. The individual soundscapes can be detected by the controller and associated with a particular user. For example, the user operating the lever of the toaster with similar amounts of force during each operation creates an individual soundscape having a particular recognizable pattern. In one example, these individual soundscapes can be detected by the controller and used to produce personalized outputs for the particular user. The controller can identify the individual user from the soundscape by using any type of pattern recognition algorithm. The controller can further produce one or more outputs personalized for that user.

In addition, the acoustic signals may be those associated with one or more users present in the shared environment of the appliance. For example, acoustic signals can be internal sounds from an HVAC system. In this example, differences in the operation states of the HVAC system may depend on the number of people present in the shared space and/or the level of activity in the space. In these examples, the sounds generated by the appliance, the HVAC system, can vary based on changed acoustics in the space where the appliance operates and/or is located.

In yet another embodiment, the acoustic signals can those produced by medium within the appliance associated the operating state of the medium, such as the sounds produced by water in the kettle during a different boiling phases, the sounds produced by the bread cooking in the toaster, the sounds produced by coffee dripping during different brewing stages. These acoustic signals can also be used to identify the operating state of the appliance 102 or the medium and may result in a particular output to the user. These acoustic signals may be completely internal to the appliance. For example, the sounds produced during the boiling stage can determine whether the water is ready for consumption and if so, alert the user with an output that is recognized as indicating such to the user. In other examples, sounds produced by the bread cooking can be used to determine whether the bread is toasted, sounds produced by the coffee dripping can be used to determine whether the coffee is brewed. In one example, acoustic signals associated with the medium can result in successively changing outputs produced by the output elements which the user can use to determine duration of cooking time. For example, the user can use the changing outputs produced as the bread is toasting to identify a particular output associated with a desired cooking time.

These sounds may vary from different operating states and the different media used in the appliance 102. For example, boiling sounds and coffee dripping may be specific to the amount of water present in the kettle or the coffee maker, and toasting sounds may be specific to the thickness of bread and the toast settings selected by the user. In another example, a vacuum cleaner can produce a particular sound when the vacuum picks up particles of dirt, which may vary based on the size of the particles and/or how full the vacuum is. The system can produce an audible output that may vary based on the varying sounds. Furthermore, these sounds may also be inaudible to the user operating the appliance 102.

In accordance with one embodiment, the controller 106 receives acoustic signal from the acoustic sensor and can further process the acoustic signal. The acoustic signals may be completely internal to the appliance, such as the acoustic signals associated with heated coil elements in a toaster. The acoustic signals may be completely external to the appliance. In one embodiment, only internal acoustic signals may be used to generate the output by the controller. In another embodiment, a combination of internal and external acoustic signals can be used.

In general, the acoustic sensor 104 receives the acoustic signal produced by the appliance 102. The acoustic sensor 104 generates an associated output signal that is received by the controller 106. In one embodiment, acoustic signals can be produced by multiple appliances located in the environment. The controller 106 can receive the acoustic signals from the multiple appliances and generate a unitary output signal based on the multiple acoustic signals. In one example, one appliance can be used to produce a main acoustic signal while any additional appliances can be used as auxiliary appliances to produce auxiliary acoustic signals. The main acoustic signal can be used to produce a main output while the auxiliary acoustic signals can be used to influence the main output. Depending on the embodiment, the associated output signal can be either an analog output signal or a digital output signal.

In one example, the controller 106 determines one or more features (or characteristics) associated with the acoustic signal. The features may include, a frequency (or a spectrum) of the acoustic signal, a sound pressure level of the acoustic signal, a relative change in sound pressure level and the spectrum of the acoustic signal, appliance 102 specific acoustic signals, acoustic signal patterns and deviation from "normal" operating acoustic signals produced by the appliance 102, as well as other features. In addition, the controller 106 can detect patterns associated with the acoustic signal or the related soundscape. For example, the controller 106 can detect repetition associated with a specific acoustic signal, such as how often the coffee maker is turned on. The features of the acoustic signal can be used by the controller 106 to determine the output produced by the output elements. Furthermore, varying features of the acoustic signal can be used by the controller 106 to determine changes to the output produced by the output elements. The acoustic signal and the associated features can change subtly or dramatically, which can result in the controller 106 varying the output and generating a dynamic output which may be perceived as pseudo-random.

In addition to the various features of the acoustic signal that may be used by the controller 106 to determine the output, the controller 106 may determine the output based on a set of pre-programmed outputs 108 stored in the appliance 102 as a library of behaviors or effects that are dynamically varied based on the received signal. According to some examples, the controller 106 may match the received acoustic signal to a stored pre-programmed output 108 and transmit a control signal based on the pre-programmed output to the output elements 109 and 110.

In one example, the pre-programmed output is associated with a particular type of output element or output effect such as a selected light, audio, tactile or other outputs alone or in combination. The changes in the acoustic signal can influence the variation in the pre-programmed output. For example, the acoustic signal from the HVAC system can be matched with a pre-programmed lighting output associated with a particular lighting network. In one example, the change in the acoustic signal can vary the color or intensity of the pre-programmed light output produced by the lighting network.

In another example, the pre-programmed output is associated with different operating states or conditions of the appliance. Different operating states can be detected by the controller and matched to a particular preprogrammed output. For example, detecting an acoustic signal indicating a boiling operating state of a kettle can be matched to a pre-programmed output which can alert the user to the boiling operating state. In another example, detecting an acoustic signal indicating that the appliance is being cleaned can be matched to a pre-programmed output. In this example, the pre-programmed output may be a sound transmitted to a speaker system over a network to another room in the user's house to alert the user of the boiling state. The variation in the received acoustic signal can vary the frequency and amplitude of the audio signal output produced by the speaker system.

In another example, the pre-programmed output may be associated with a particular user. As mentioned above, the controller can detect individual soundscapes and can associate the individual soundscapes with particular pre-programmed outputs associated with the individual user. The pre-programmed outputs can produce one or more output effects personalized for each user.

In yet another example, the pre-programmed outputs may be associated with appliance "personalities." Outputs generated by the controller 106 can correspond to specific behaviors associated with these personalities. For example, one particular appliance can have an "introverted personality" and the controller can match the received acoustic signal to subdued pre-programmed outputs, such as a low intensity light or a low amplitude sound outputs. Conversely, acoustic signals received from an "extroverted personality" appliance can be matched to pre-programmed outputs, such as high intensity light or high amplitude sound outputs. The variation in the received acoustic signal can vary the pre-programmed outputs within a range established in accordance with the "personality" of the appliance.

In one embodiment, changes to the acoustic signal and the associated features result from changes in the operation state of the appliance 102. The acoustic signals may change subtly or dramatically as the operating state of the appliance 102 changes. For example, the kettle can transition from the operating state of being turned off to the operating state of the pre-boiling phase as the water is heated in the kettle, and then to the operating state of the boiling phase as the water boils in the kettle. Each operating state has a particular acoustic signal associated with it. As the operating stages change, the acoustic signals can also change, resulting in changed input received by the controller 106. In one example, the controller determines whether the detected operating state exceeds an operating state selected by a user. For example, the controller can detect whether a pot is boiling when it should be simmering as selected by the user. The changes to the input can result in varying outputs to the output elements, resulting in varied output effects 112 presented to the user.

In another embodiment, changes to the features of the acoustic signal can be caused by changes in the user's operation of the appliance 102. For example, the user can depress a lever of a toaster to activate the toaster and toast bread. The motion of the lever can produce a first acoustic signal associated with this particular activation. The first acoustic signal can have associated features relating to, for example, the amount of force applied by the user while depressing the handle. This first acoustic signal can be processed by the controller 106 and result in a first output by the output elements, which reflects the acoustic features associated with the amount of force. The user, in another instance, can depress the handle to the toaster with different amount of force. This motion can produce a second acoustic signal, which may be different from the first acoustic signal. The second acoustic signal has associated features relating to, the different amount of force applied by the user. The controller 106 can process the second acoustic signal and determine which features of the acoustic signal are different, and can generate a second output by the output elements. In one example, differences in the acoustic signal can be detected by determining the sound pressure level of the received signal and comparing it to the sound pressure level of any subsequent signal.

In one embodiment, the acoustic signals associated with the appliance 102 may subtly change with use or over time. For example, the acoustic signal may subtly change as the appliance 102 warms up or as parts become more worn or loosen up. Changes to the signal can also result from parts malfunctioning and producing sounds that deviate from the acoustic signal associated with the non-malfunctioning appliance 102. For example, a broken spring mechanism in the toaster can result in a different acoustic signal as the toast is popped out of the toaster, than the normal operation of the toaster. In one example, an acoustic signal produced by the appliance 102 can be stored in the controller 106 and any subsequent acoustic signals can be compared to it. By comparing subsequent acoustic signals, the controller 106 can determine that the acoustic signal has deviated from "normal" acoustic signal and can produce an output that can alert the user to the malfunctioning condition of the appliance 102. Further, the stored acoustic signals can be used by the controller to generate and store a soundscape history. In one example, the soundscape history can be used to analyze the life of the appliance and can be further used to diagnose and repair appliances.

According to various embodiments of the present invention, the changing nature of the acoustic signal is detected by the controller and is used to vary the output to produce dynamic and non-repetitive output effects to the user in the environment. The change to the output effects can be either subtle or dramatic based on similar changes in the acoustic signal. The controller can further determine which output elements to control in order to produce the desired effect to the user. In one example, the controller can determine which output elements to control based on the pre-programmed output as described above.

The controller 106 can produce a control signal to transmit to one or more output elements 109 and 110 and control the output elements 109 and 110 to produce one or more output effects 112. In one example, the output elements 109 and 110 can include a lighting source or a lighting network, a tactile (for example vibration) feedback mechanism, or a speaker system, as well as any other output elements that can be used to provide an output effect to the user.

As shown in FIG. 1, the output elements 109 can be disposed in the appliance. In one example, the output elements 109 can be included as part of a user interface of the appliance such as a display or a touch screen interface. The output elements 109 can also be included in parts of the appliances such as buttons, switches, knobs, light indicators or sound indicators. The output elements 110 can be external to the appliance 102 located within the environment 101 and can be controlled by one or more dedicated controllers. In one example, the output elements 110 can be part of a lighting network disposed throughout the environment, such as decorative and/or ambient lighting fixtures disposed throughout a home or office environment.

In one embodiment, the output elements 110 can be located throughout the entire environment 101, such as the lighting network. In another embodiment, the output elements 110 are located in only in a part of the environment 101. As mentioned above, in some embodiments, the output elements 109 are localized to the appliance, such as lighting or a tactile feedback mechanism. Further, the output effects 112 produced in the environment 101 can be produced in the entire environment, only a part of the environment, or be localized to the appliance. For example, the lighting network can produce lighting effects throughout the home, while the tactile feedback mechanism can produce vibration effects localized to the appliance.

Further, the appliances, the output elements 110, and any external sensors can be interconnected in the environment 101, for example through a wireless network. For example, one or more appliances, external sensors and the output elements 110 can be part of a connected house environment. In one example, the acoustic signal from one appliance located in one part of the environment 101 can influence an output from an output element located in another part of the environment 101. In another example, the operation of one of the appliances may be detected by external sensors and may influence the output produced. In one example, the controller can determine the location of the output to be produced based on a number of factors, such as user presence in the environment 101.

One or more of the output elements 109 and 110 may be used to deliver the output effects 112 to the user. The controller 106 may control particular output elements 109 and 110 to produce the desired output effects 112 to the user. The output produced by the controller 106 can be configured to reflect the type of output element and can include a control signal for a hardwired output element, or a control signal sent over a network for a remote output element. The control signal sent over the network may be a wired or a wireless signal and may be converted to a suitable protocol as further described below.

Such output effects 112 may further drive user behavior. For example, the user may grow to appreciate the link between the appliance 102 as the source and the non-repetitive and dynamic output effects 112. This may make the user more interested in and emotionally attached to the appliance. For example, if the user appreciates that the user's actions influence the output effects 112 produced, the user may increase use of the appliance or attempt to vary the operation of the appliance in order to influence the output effects 112. Thus, making the appliance 102 more user-friendly.

Additionally, the output effects 112 may inform the users of the operating condition of the appliance. For example, lighting or sound effects can inform users that the appliance has changed operating states or has deviated from normal operation. Furthermore, dynamic lighting effects (for example a light show) and sound effects (for example an audiospace) may be appreciated for the artistic effect causing the user (or others in the environment 101) to appreciate the link between the appliance and the output effects 112.

According to one embodiment, the control signal can control light produced by a light fixture or a lighting network, including the intensity, the duration, and the color of the light produced. In one example a lighting source or a lighting network can include one or more lighting units connected together. The lighting units may be LED, incandescent, fluorescent, halogen, laser, or any other type of light source.

The light source or the lighting network can be controlled to produce an output effect that includes one or more lighting effects or a light show. The lighting effect is a change in lighting perceivable by the user. It is appreciated that the soundscape associated with an appliance can be produced in one location and the lighting effect can be perceived by the user in another location remotely from the appliance. For example, a refrigerator located in a kitchen can provide the acoustic signals used by the controller to provide party lighting effects by a lighting fixture located in the living room. According to one embodiment of the present invention, the control signal can also control a pattern, sequence and/or timing of the lighting effect produced by the lighting network, as described further below. In one example, the sequence of light can include to two or more lighting effects spaced in time produced by the lighting units (for example LEDs) of the light source or the lighting network. The lighting units may have one more color changing properties, and the control signal can control a sequence of colors displayed by the light fixture. The variation detected in the acoustic signal received from the operation of the appliance can control the sequence of the lighting effects displayed by the light fixture.

In one example, a first acoustic signal received by the controller can result in a first lighting sequence that includes particular lighting effects having a particular intensity, color changing properties and timing. The operation of the appliance can produce a second acoustic signal received the controller which can result in a second lighting sequence. The controller can vary the first lighting sequence to the second lighting sequence having a different intensity, color changing properties and/or timing. The second lighting sequence can include subtle or dramatic differences from the first lighting sequence based on subtle or dramatic differences in the first and second acoustic signals. According to one embodiment, the dynamic lighting effect is achieved using decorative wall tiles that include light sources.

In one example, to transition between the first and second lighting sequences, the controller can introduce a transition sequence between the first and the second lighting sequences. Similar to the first and second lighting sequences, the transition sequence can be based on the soundscape of the appliance and the associated acoustic signals. Thus, different soundscapes and acoustic signals can produce different transitions. For example, the transition sequence can be smooth or rapid based on subtle or dramatic differences in the first and second acoustic signals.

According to one embodiment, the control signal can control sound produced by a speaker system, including the amplitude, the duration and the frequency of the sound. The sound can be any audio signal such as recorded music, recorded human voice, computer generated voice, ringtone or an alert signal. The control signal can also control the sequence and/or the timing of the sounds produced by the speaker system. For example, the sequence of sound can include two or more audio effects spaced in time produced by the speaker system. The sequence may be determined by features of the acoustic signal and/or changes to the acoustic signal as described above.

According to a further embodiment, the control signal can control a tactile (for example vibration) feedback mechanism to provide a vibration output to the user. For example, the appliance 102 may have or more interface elements such as a graphical user interface which may accept input from the user. Other interface elements may be included such as buttons, switches or knobs. These interface element may include the tactile feedback mechanism through which a vibration can be delivered to the user. In one example, the control signal may control the sensitivity level of the vibration by controlling a frequency and an intensity of the vibration.

In one embodiment, the control signal can attach priorities or cues to one or more outputs which can cause a particular output element to change one or more outputs effect 112 based on receipt of a cue. This cue could be any type of cue, received externally or internally to the system, and includes, but is not limited to, a cue determined from a received acoustic signal, a cue received from a user operating an appliance such the user operating a manual device such as a switch on the appliance, a cue generated by the system such as an internal clocking mechanism, an internal memory cue, or a software based one, or a cue generated from an analog or digital device attached to the system such as an external sensor.

In one example, on receipt of a cue, the controller can select a particular pre-programmed output 108. The selected pre-programmed output 108 can vary dynamically based on changes to the received acoustic signal. For example, on receipt of a cue received from a door opening in a refrigerator, the controller can match a pre-programmed lighting output produced by a particular lighting source associated with the refrigerator and/or the environment 101, which may include a particular color and pulsed frequency. Further, the color and/or the pulsed frequency of the pre-programmed lighting output can vary dynamically based on the changes to the acoustic signals received from the refrigerator.

In one example, the controller 106 can set a default priority output effect 112 associated with the output elements 109 and 110, which is the effect used by the output element unless a particular cue is received. In this example, as the cue is receive the controller 106 instructs the output elements 109 and 110 to use of a different effect. This change of effect could be temporary, occurring only while the cue occurs or defined for a specified period, could be permanent in that it does not allow for further receipt of other effects or cues, or could be priority based, waiting for a new cue to return to the original effect or select a new one. Alternatively, the controller 106 could select output effects 112 based on the state of a cue and the importance of a desired effect. For instance, if the controller 106 detected an acoustic signal that fundamentally deviated from previous signals, the controller 106 could trigger a high priority alarm effect overriding all the effects otherwise present or awaiting execution. The priority could also be state dependent where a cue selects an alternative effect or is ignored depending on the current state of the system. It should be appreciated that the embodiments of the present invention that employ priorities or cues for various output effects 112 are not limited to the particular types of cues and priorities described above, as numerous other types are possible.

The controller 106 can also receive input from additional external sensors (not shown), which can also be used to modify determined outputs, sequences or priority effects. Further, changes in the acoustic signal can influence subtle variation within those modified outputs. The acoustic signal can be solely internal or solely external to the appliance. For example, an ambient light sensor may be used to modify the intensity of the lights, for example, to maintain a constant lighting level regardless of the amount of sunlight entering a room, or to make sure a lighting effect is prominent despite the presence of other sources of light. Changes in the pattern of the acoustic signal can influence subtle variation in the constant lighting level, for example by subtly varying the color temperature of the constant light. A motion sensor or other detector may be used as a trigger to start or alter a lighting sequence. For example, the lighting sequence may change when a person approaches the appliance. The intensity of the light can change with changes to the sound pressure level of the acoustic signal external to the appliance. Temperature sensors may also be used to provide input. For example, the color of light in a freezer may be programmed to be dependent on temperature, e.g., providing blue light to indicate cold temperature, changing gradually to red as the temperature rises, until a critical temperature is reached, whereupon a flashing or other warning effect may begin. Changes to the acoustic signals internal to the freezer may change the intensity of the blue light, the speed of the gradual change to red, or the frequency of the flashing as the critical temperature is reached. Similarly, an alarm system may be used to provide a signal that triggers a lighting sequence or effect for providing a warning, distress signal, or other indication. In one example, an interactive lighting sequence may be created, wherein the executed effect subtly varies according to the changes to the acoustic signal received and the external sensors may act as cues or triggers to dramatically vary the lighting effects or execute different lighting effects.

Figure 2:
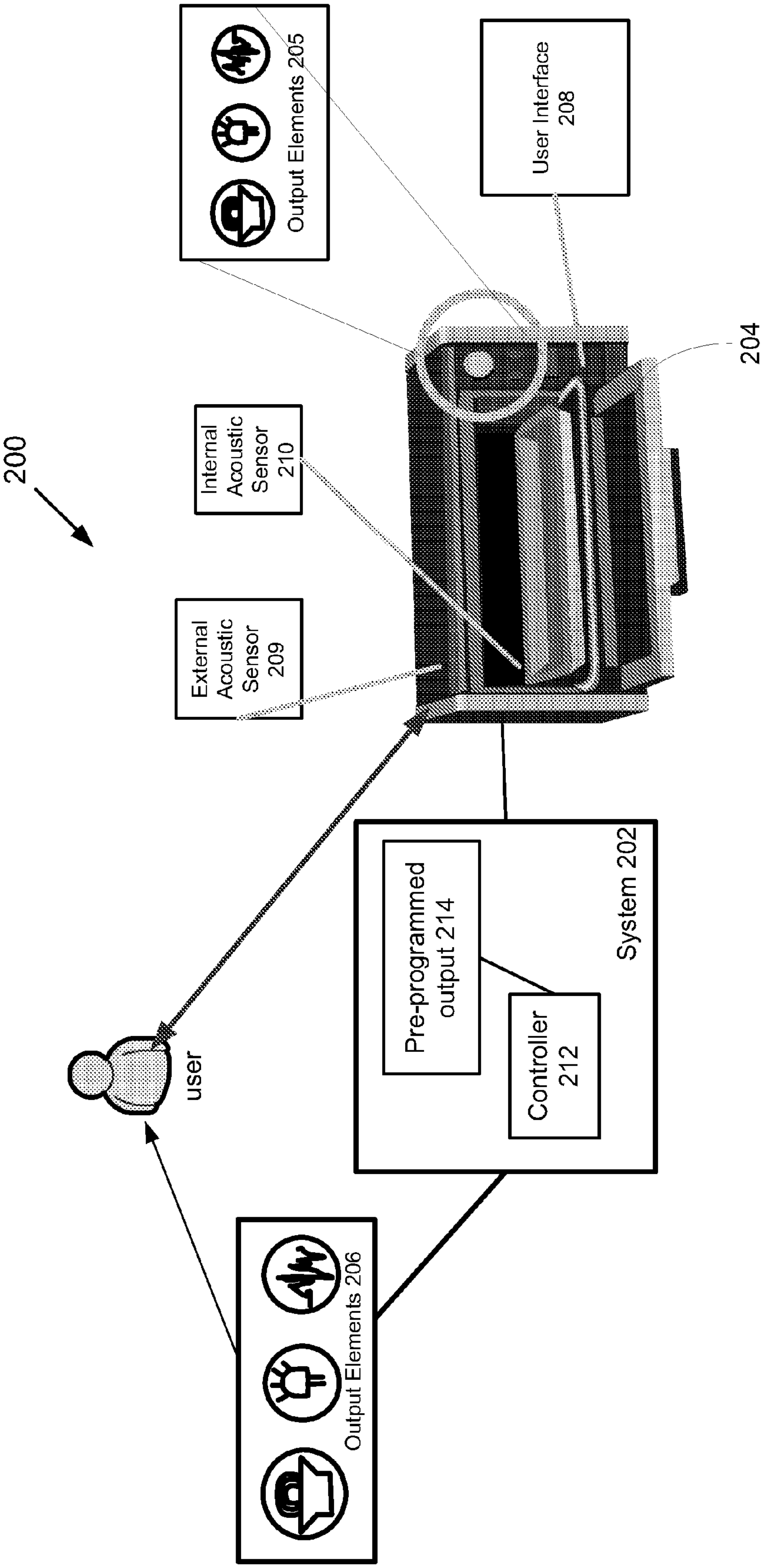
FIG. 2 illustrates a block diagram of a system including an appliance in accordance with one embodiment.

FIG. 2 in one embodiment illustrates a distributed system 200 that includes a system 202 for an appliance in accordance with one embodiment. In the illustrated embodiment, the appliance is a toaster oven 204. Although the appliance is shown as a toaster oven, any appliance may be used in accordance with various embodiments of the system. As shown in FIG. 2, the system 202 is disposed apart from the toaster oven 204. However, in general, the elements of the system 202 and operation of the system 202 are similar to the elements and operation described with reference to FIG. 1.

As shown in FIG. 2, the toaster oven 204 may include internal output elements 205 and external output elements 206 disposed in body of the toaster oven 204, such as lighting sources, speaker systems or tactile feedback systems described above. The toaster oven 204 may also include a user interface 208 which may include lighting sources (not shown) such as back lighting sources and decorative lighting sources and an additional tactile feedback system (not shown). Furthermore, the toaster oven 204 may include external acoustic sensor 209 or internal acoustic sensors 210 disposed in the body of the toaster oven configured to detect internal or external sounds to the appliance.

The system 202 can include a controller 212 and a pre-programmed output 214. In various embodiments, the controller 212 of the system 202 receives the acoustic signal from the external acoustic sensor 209 and/or the internal acoustic sensor 210 associated with the toaster oven 204. The acoustic signals can be processed by the controller 212 to determine features of the acoustic signal, which can be used (in combination with the pre-programmed outputs 214) to produce a control signal to control output elements 206 or output elements 205. As shown, the output elements 206 may be disposed in the toaster oven 204 and the output elements 205 may be disposed apart from the toaster oven 204 and the system 202. The output elements 205 and 206 may include a single output element or multiple output elements. The output elements 205 and 206 can also include a combination of different types of elements such as lighting elements, sound elements, and/or tactile elements.

In various examples, the user interface 208 allows the user to control and change the output elements and the output effects produced. In one example, the user can change the output style, the appliances that influence the output effects, control combined effects from one or more appliances, change or control input from external sensors, change cues or priorities, the pre-programmed outputs associated with specific users or appliances as well as other configurations of the system 200.

Figure 3:
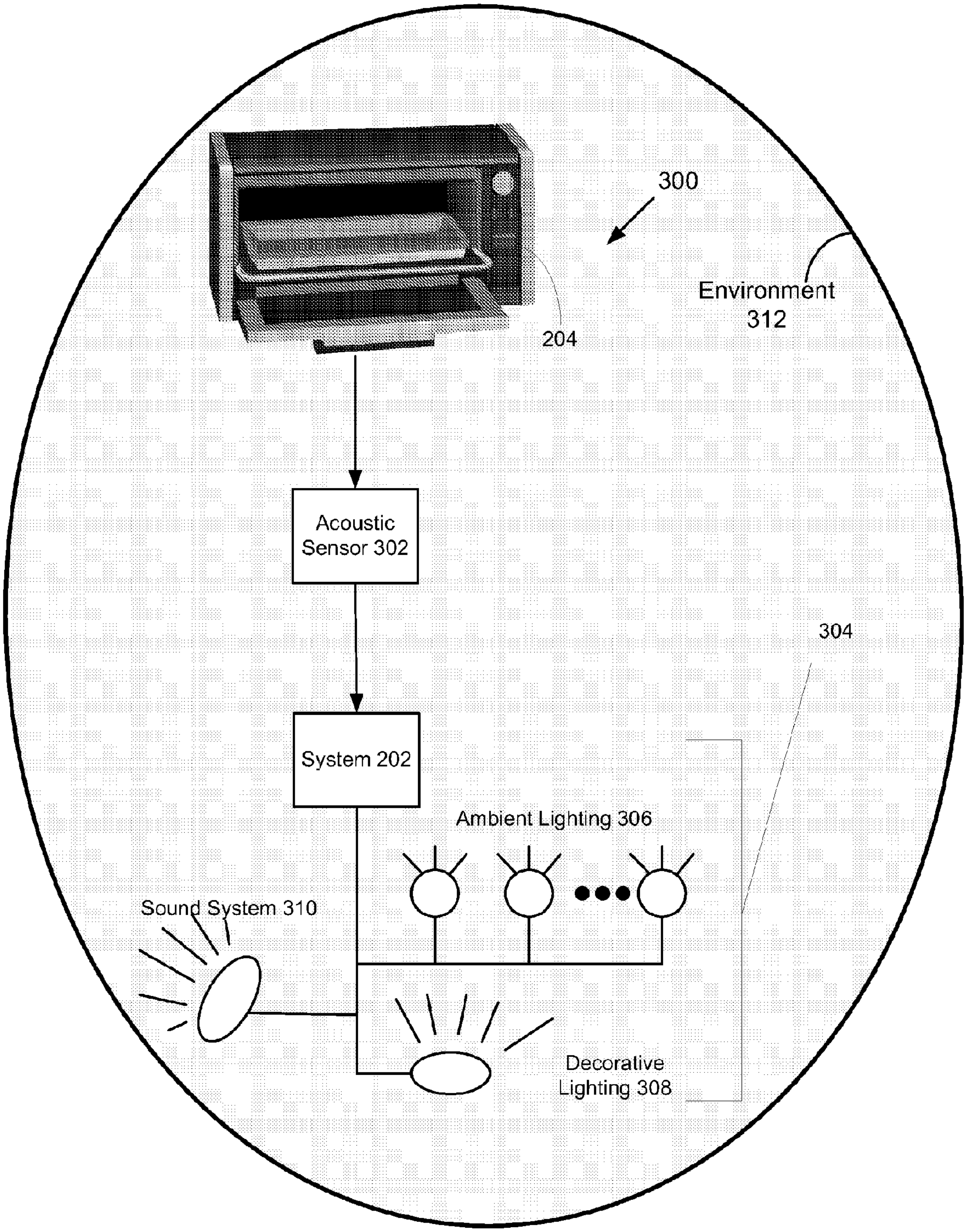
FIG. 3 illustrates a block diagram of a system including an appliance in accordance with another embodiment.

FIG. 3 illustrates another embodiment of a distributed system 300 that includes a system 202 for an appliance 204 in accordance with one embodiment. In the illustrated embodiment, each of the output elements 206, the toaster oven 204, the acoustic sensor 302 and the system 202 are disposed apart from each other. In one embodiment, the output elements include a lighting network 304, including a plurality of lighting fixtures and also a sound system 310. The lighting network 304 can be used to provide ambient lighting 306 or decorative lighting 308 in an environment 312 associated with the appliance 204 and perceived by the user and/or others in the environment 312. The sound system 310 can also be used to provide various sound effects in the environment 312 associated with the appliance 204.

Where the lighting network 304 provides ambient lighting 306, the lighting may include light that is perceived indirectly. For example, the light may be reflected off of one or more of a variety of intervening surfaces before being perceived in whole or in part by the user. For example, ambient lighting 306 can be provided to light a room of a house or an office in an office building. In one example, where the lighting network 304 controls ambient lighting in an office environment, the acoustic signals of the HVAC system can be used to increase or decrease the ambient lighting provided in the office space. Differences in the operating states can depend on the occupancy in the office space, and can drive the changes in the acoustic signal resulting in different amounts of ambient lighting provided. For example, the features of the output from the HVAC system (the air flow and the air temperature) change with more or fewer people occupying the office space.

Where the lighting network 304 provides decorative lighting 308, the decorative lighting may be used for aesthetic purposes and may include one or more lighting fixtures comprising rope lights, wall tiles, mats, electronic textiles, as well as others. Decorative lighting 308 may be disposed in homes, retail locations, offices or other environments. The changing acoustic signals can be used by the system 202 to vary the output from the decorative lighting producing decorative lighting effects. Due to the changing features of the acoustic signal, the decorative lighting effects produced are non-repetitive and perceivable to individuals in the environment 312 associated with the appliance.

In one example of an office environment, the use of the acoustic signals associated with the coffee machine can be used to provide decorative lighting effects in the form of a textile panel in the office environment. Such output effects may further drive user behavior and make the users aware of the operating condition of the appliance, for example the decorative lighting effects can inform people that colleagues are taking a break or the coffee machine is busy. The non-repetitive and dynamic decorative lighting effects may be appreciated for the artistic effect without appreciating the link between the appliances as the generator of the decorative lighting effects. In another example, the user may appreciate the link between the appliance as the source and the non-repetitive and dynamic decorative lighting effects may make the user more interested in and emotionally attached to the appliance.

In one example, the system 202 may combine various types of output effects to produce a dynamic, multi-modal output. For example, light outputs produced by the lighting network 304 can be combined with various sound outputs produced by the sound system 310 to create multi-modal outputs that include both sound and light. The changes detected in the acoustic signal can vary the multi-modal output by varying single or multiple types of outputs. In one example, only the sound output or the light output is varied, in another example, both the sound and light output are varied.

In some embodiments, pre-programmed outputs that include light only, sound only or a combination of each, can be further varied with the changing soundscape of the appliance For example, the lighting network 304 may provide dynamic lighting effects in the form of a light show by controlling networked lighting units in sequences or patterns in response to changing acoustic signals, as described above. In another example, the output elements may provide dynamic audioscape in the form of ambient music or sounds by controlling a networked sound system. It is appreciated that the dynamic nature of the output is driven by the varying acoustic signal received by the controller. As a result, these dynamic outputs may appear to be pseudo-random to the user can be used to produce an artistic effect appreciated by the user. Further, the user may appreciate the source of the varying signal and as a result may further appreciate and enjoy using the appliance.

Figure 4:
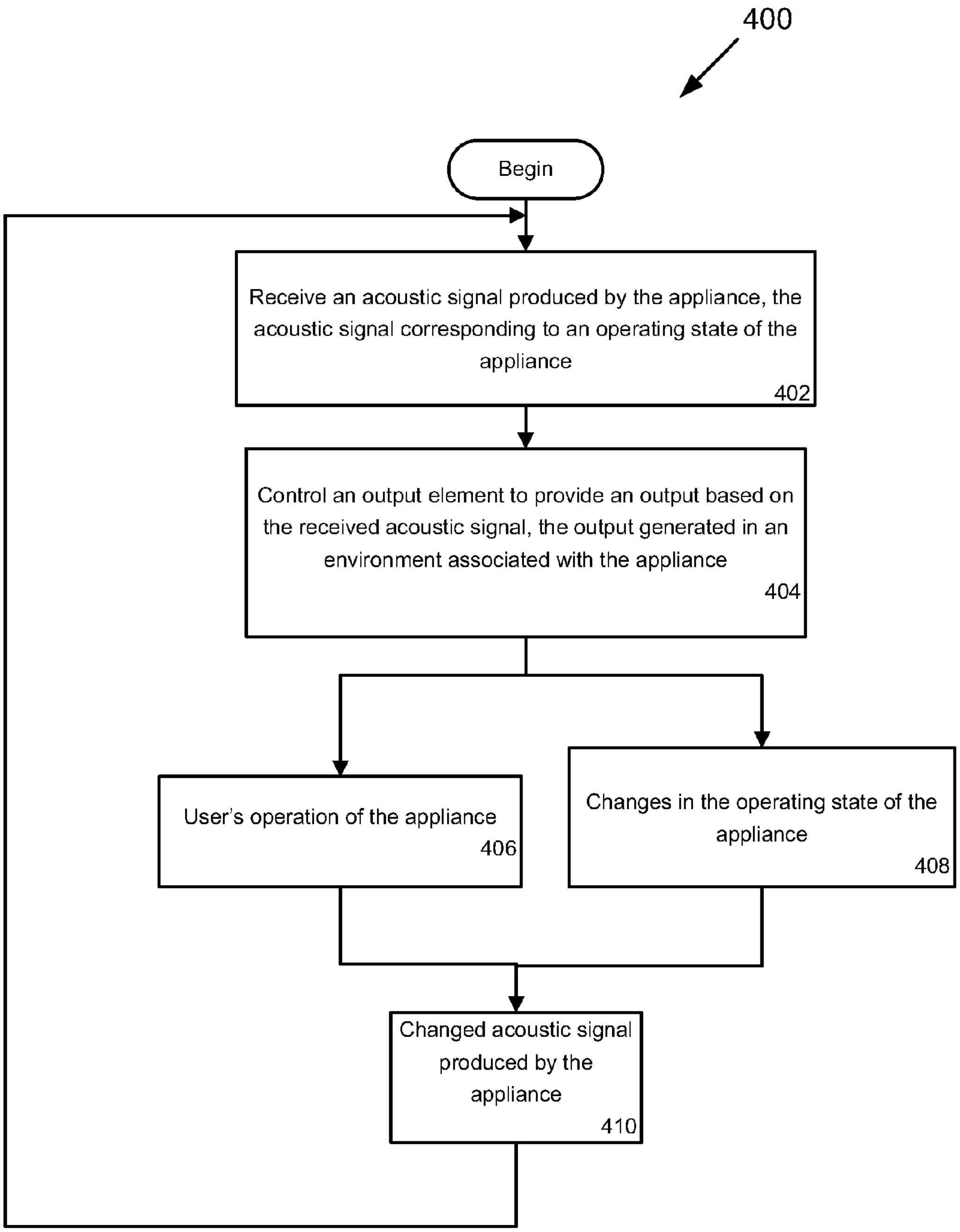
FIG. 4 illustrates a flow chart of a process for producing an output associated with an appliance in accordance with one embodiment.

An illustrative process 400 of producing an output associated with an appliance is described with reference to FIG. 4. Process 400 provides a feedback loop that allows the output to be dynamically varied based on differences in the acoustic signal resulting from the change in the operating state of the appliance. According to the process, at step 402 an acoustic signal produced by the appliance is received by an acoustic sensor. In one example, the acoustic signal corresponds to an operating state of the appliance such as a boiling state described in reference to a kettle. At step 404, an output based on the received acoustic signal is provided by the output element. In this step, the output is generated in an environment associated with the appliance.

At step 406, a user's operation of the appliance 102 results in a changed acoustic signal produced by the appliance. In some embodiments, the change is directly caused by the user's actions of operating the appliance. In other embodiments, the change is caused by a changed state of the appliance caused by the user's interaction. Further, at step 408, changes in the operating state of the appliance result in changes to the acoustic signal produced by the appliance, independent of the user's operation of the appliance. At step 410, a changed acoustic signal provided by the appliance results (for example, as sensed by the acoustic sensor 104). The process returns to step 402 where the changed acoustic signal is received (for example, by the controller 106). At step 404, the output elements (for example output elements 110, 112) are controlled to provide the output based on the now-changed acoustic signal. As a result of the continuously changing acoustic signal, a dynamic input is provided to the controller. According to some embodiments, the dynamic input is used by the controller to generate a pseudo-random output.

In one example, the output elements provide feedback to the user in the environment associated with the appliance. The feedback to the user can further result in the user operating the appliance to change the operating state.

In one embodiment, step 402 can include receiving a first acoustic signal corresponding to a first operating state of the appliance and receiving a second acoustic signal corresponding to a second operating state of the appliance, the second operating state being different than the first operating state. For example, the first operating state can correspond to the toaster oven being "turned on" and the toaster oven can produce the first acoustic signal (e.g. operation of the toaster's lever). While the second operating state can correspond to the toaster oven "toasting" and producing a second acoustic signal (e.g. sound of toasting bread) corresponding to the second operating state.

In one embodiment, the step 404 can include controlling the output element to provide a first output corresponding to the first operating state of the appliance, and controlling the output element to provide a second output based on the second acoustic signal corresponding to the second operating state of the appliance. Where, for example, the first output corresponds to the toaster oven being turned on a steady light output can be provided by a light source. In this example, the second output corresponds to the toaster oven "toasting" and a flickering light can be produced by the light source. The frequency of the flickering light can be varied (for example, by the controller 106) based on the cooking state of the bread in the toaster oven. For example, the rate of flickering can be increased as the acoustic signal changes as the bread becomes more toasted. It is appreciated that other lighting effects can be produced by the light source such as pulsating light, color morphing effects, dimming effects, other controlled changes to the light or other output modalities.

In this example, the change in the operating state from the first operating state to the second operating state occurs as a result of a user operating the appliance and the bread being toasted in the toaster oven. However, in some embodiments, the change from the first operating state to the second operating state can occur independent of a user's operation of the appliance.

Figure 5:
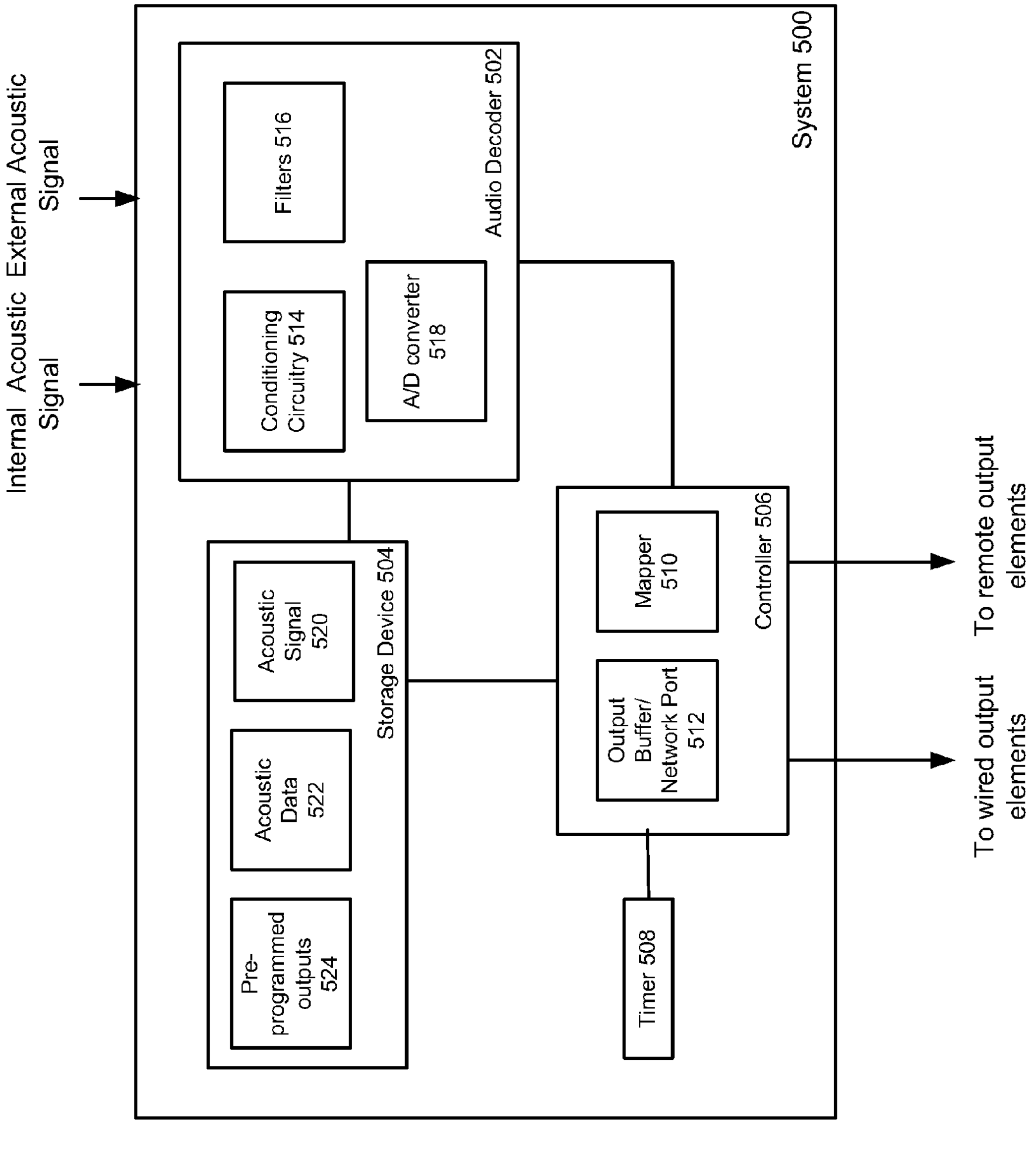
FIG. 5 illustrates a block diagram of a system in accordance with one embodiment.

Referring to FIG. 5, which in one embodiment, illustrates a system 500 according to various embodiments of the present invention. In the embodiment shown in FIG. 5, the system 500 includes an audio decoder 502, a storage device 504, a controller 506, and a timer 508. The audio decoder 502 is configured to receive the acoustic signal from one or more internal and/or external acoustic sensors and condition the raw received acoustic signal to produce acoustic data. In the illustrated embodiment, the audio decoder 502 includes conditioning circuitry 514, one or more filters 516, and an Analog-to-Digital (A/D) converter 518. The storage device 504 is configured store the raw acoustic signal 520 and/or the produced acoustic data 522 received from the audio decoder 502. The storage device 504 can also store the pre-programmed output 524, for example, the pre-programmed output corresponds to one or more general operating states of the appliance as indicated by the soundscape produced by the operation of the appliance. As described above, these pre-programmed outputs 524 can be used to provide dynamically varied output effects. The controller 506 is configured to receive the acoustic data from the audio decoder 502 and/or the storage device 504 and generate a control signal output which can be provided to one or more output elements. According to some embodiments, the controller 506 includes a mapper 510 and an output buffer/network port 512. The timer 508 is configured to produce an input to the controller 506 to vary or control timing associated with the control signal. However, it should be appreciated that this embodiment of the present invention is not limited to the implementation shown in FIG. 5, as numerous other implementations are possible.

According to various embodiments, the system 500 receives as input internal acoustic signals from an internal acoustic sensor and/or external acoustic signal from an external acoustic sensor, and outputs a control signal to the output elements wired directly to the system and/or a network signal to output elements located remotely from the system (e.g. over a network). According to one embodiment, a wireless network is used to communicate the output control signal to one or more output elements.

According to various embodiments, the audio decoder 502 can process the received signal and may generate an output having information reflective of one or more features of the acoustic signal. In one embodiment, the audio decoder 502 can include conditioning circuitry 514 that converts the raw acoustic data received from the acoustic sensor into one or more values to be interpreted by the audio decoder 502. The audio decoder 502 can further include one or more filters 516, such as a low pass filter and an external noise filter which may be used to remove high frequency noise and filter outlying data portions of the acoustic signal. In one example, the audio decoder 502 includes the A/D converter 518 configured to convert the received analog acoustic signal into digital form. The audio decoder 502 can be implemented in dedicated hardware, or can be implemented in software executed on a processor (not shown) within the system.

The audio decoder 502 can perform additional signal processing functions, such as determining features of the acoustic signal described above. In other embodiments however, these functions can be performed by the controller 506. Examples of features of the acoustic signal can include, but are not limited to, information relating to a frequency (or a spectrum) of the acoustic signal, a sound pressure level of the acoustic signal, a relative change in sound pressure level and the spectrum of the acoustic signal, appliance specific acoustic signals, acoustic signal patterns and deviation from "normal" operating acoustic signals produced by the appliance, as well as other features.

In accordance with one embodiment of the present invention, various signal processing techniques are used to analyze the acoustic signal. It should be appreciated that there are many different types of processes or analyses that can be performed using signal processing techniques, and the present invention is not limited to any particular technique for analyzing the acoustic signal. For example, the audio decoder 502 may generate time domain information for the audio signal, representing the intensity of the acoustic signal over time. The time domain information may be outputted as an array, wherein each array element is an integer representing the intensity of the acoustic signal for a given point in time, or in any other suitable format. Audio decoder 502 may further generate frequency domain information by performing a Laplace transform (examples of which include a Fourier transform and a fast Fourier transform (FFT)) of time domain information for the acoustic signal. In one embodiment, a fast Fourier transform is performed, but the present invention is not limited in this respect and can employ any suitable technique for analysis in the frequency domain. The frequency domain information may be outputted as an array, wherein each array element is an integer representing the intensity of the acoustic signal for a given point in time. Audio decoder 502 may further generate frequency domain information by performing a fast Fourier transform (FFT) of time domain information for the acoustic signal. The frequency domain information may be outputted as an array, wherein each array element can be an integer representing the amplitude of the signal for a given frequency band during a corresponding time frame. In accordance with one embodiment of the present invention, the frequency domain information is the FFT of the corresponding time domain information for a particular time frame.

The system 500 may further include the storage device 504, such as a memory unit, database, or other suitable module (e.g., a removable Flash memory), for storing acoustic data associated the processed acoustic signal. In addition to storing acoustic data, the storage device 504 may store pre-programmed output described above and the mapping table described further below. In addition, the storage device 504 may store a plurality of effects and instructions for converting those effects into a data format or protocol, such as wired or wireless transmission protocol, suitable for controlling the output elements. In embodiments wherein the pre-programmed outputs are used, suitable instructions may be included in the control program (described further below) and stored in storage device 504, e.g., upon loading or execution of the control program. The controller may be configured to access the storage device 504 to retrieve the necessary information to perform the functions described here. It should be appreciated that the aspects and functions of the storage device 504 may be performed by the controller.

In one embodiment, the controller 506 receives the output from the audio decoder 502 and via the mapper 510 generates the control signal based on various features of the acoustic signal. As described above, the control signal can be based on the changes in the acoustic signal and can vary one or more outputs produced by the output elements to produce dynamic output effects perceived by the user in the environment. In one embodiment, the mapper 510 determines an output program configured to control the output elements based on control signal transmitted to the output elements. The control program may be programmed using a number of if/then statements or Boolean logic to interpret the numerous varied permutations of acoustic signals received from the acoustic sensor relating to features of the acoustic signal. The control program may further include a state recognition algorithm. The state recognition algorithm may interpret the corresponding operating states of the appliance, for example boil phases of a kettle or mixing stages of a food processor from the processed acoustic signal. To perform this function, the mapper 510 may further include a mapping table having stored operating states and corresponding acoustic signal features. The mapper 510 may be configured to match the acoustic data and/or the associated features with stored operating states in the mapping table.

The control program can generate the control signals transmitted to the output element, which can control the output elements and result in the output effects perceived by the user. The control signals can be transmitted to the output elements, for example the lighting network, to produce one or more outputs. As the features of the acoustic signal change over time, resulting in changing inputs to the mapper 510 the mapper 510 generates changing control signals which are sent to the output elements. The control program may be implemented in any of numerous ways, as the invention is not limited to any particular implementation. For example, the control program may be a stand-alone application, such as an executable image of a C++ or Fortran program or other executable code and/or libraries.

The system may further include the timer 508 that provides input to the controller. In accordance with one embodiment, the timer 508 is used to provide variation over time in the mapping function executed by the mapper 510, to achieve resulting variation in the control signals sent to the output elements and thereby reduce redundancy in the output effects produced in response to the acoustic signals. For example, if the output effects change too subtly for the user to appreciate, the timer 508 may introduce additional variation into the control signals by varying the output at predetermined time intervals. In one embodiment, the timer 508 can further include date and time information, such that the mapping functions can change as a result of the date and/or time. For example, based on time of day information, the controller can determine the levels of expected natural light provided to an office environment and can further adjust light levels produced by a light network accordingly. In another example, based on day of the week information, the controller can determine expected occupancy of the environment and adjust outputs accordingly. In another embodiment, the timer 508 may introduce internal timing information so that the mapping function can be changed as a result of the amount of time that a particular control program, sequence, pattern, has been executed, a particular output has been activated/deactivated, or to time a particular operating state associated with an appliance. For example, the timer can calculate how long a light source has been activated, or how long has the kettle been in the boiling operating state.

The output buffer and the network output port 512 may be configured to facilitate the transmission of control signals from the controller 506 to the output elements. It should be appreciated that the information stored in the mapping table and output from the mapper 510 may not be in a format capable of directly controlling the various output elements. In this embodiment, the output buffer and the network port 512 may convert the control signal from the controller 506 to a format accepted by the particular output element. For example, the output buffer 512 may convert the control signal to a wired transmission data format such as DMX, RS-485, RS-232 or a wireless transmission data format such as Z-Wave, ZigBee, X10, and Insteon. However, it should be appreciated that the present invention is not limited in this respect, as no output buffer need be used.

Using pulse-width modulated signals, the output elements may be driven with a fixed current or voltage that is then turned on or off in accordance with a pulse-width modulated control signal. Alternatively, the output elements may be driven using analog techniques where the current or voltage level is varied with time, pulse amplitude modulation or any other technique that varies the power through the output elements in response to a control signal.

The controller 506 may further communicate with the output elements by radio frequency (RF), ultrasonic, auditory, infrared (IR), optical, microwave, laser, electromagnetic, any type of computer link or any other suitable transmission or connection technique. To facilitate communication, each output element may be associated with a predetermined assigned address either unique to that output element or overlapping the address of other output elements to facilitate communication with the controller.

It should be appreciated that the controller 506 can be implemented in any of numerous ways, including with dedicated hardware, or with software executed on a processor (not shown) within the system. When implemented in software, the software can be stored on any storage medium accessible to the system, including a storage device 504 that stores the audio data. The processor may include any system for processing in response to a signal or data, as the present invention is not limited to any particular type of processor.

In one embodiment of the present invention, the analyzing of an acoustic input signal is performed essentially simultaneously with the output provided to the output elements to produce real-time output effects. However, the present invention is not limited in this respect, as in other embodiments, the analysis of the acoustic input signal is performed with a desired delay prior to producing the output effects. This can provide for some flexibility in performing the mapping of the acoustic input signal to control signals for the output elements, as the mapping function can consider not only the characteristics of the acoustic signal that corresponds with the instant in time for the control signals being generated, but can also look ahead in the acoustic signal to anticipate changes that will occur, and thereby institute output effects in advance of a change in the acoustic signal based on known trends and/or operating histories.

Figure 6:
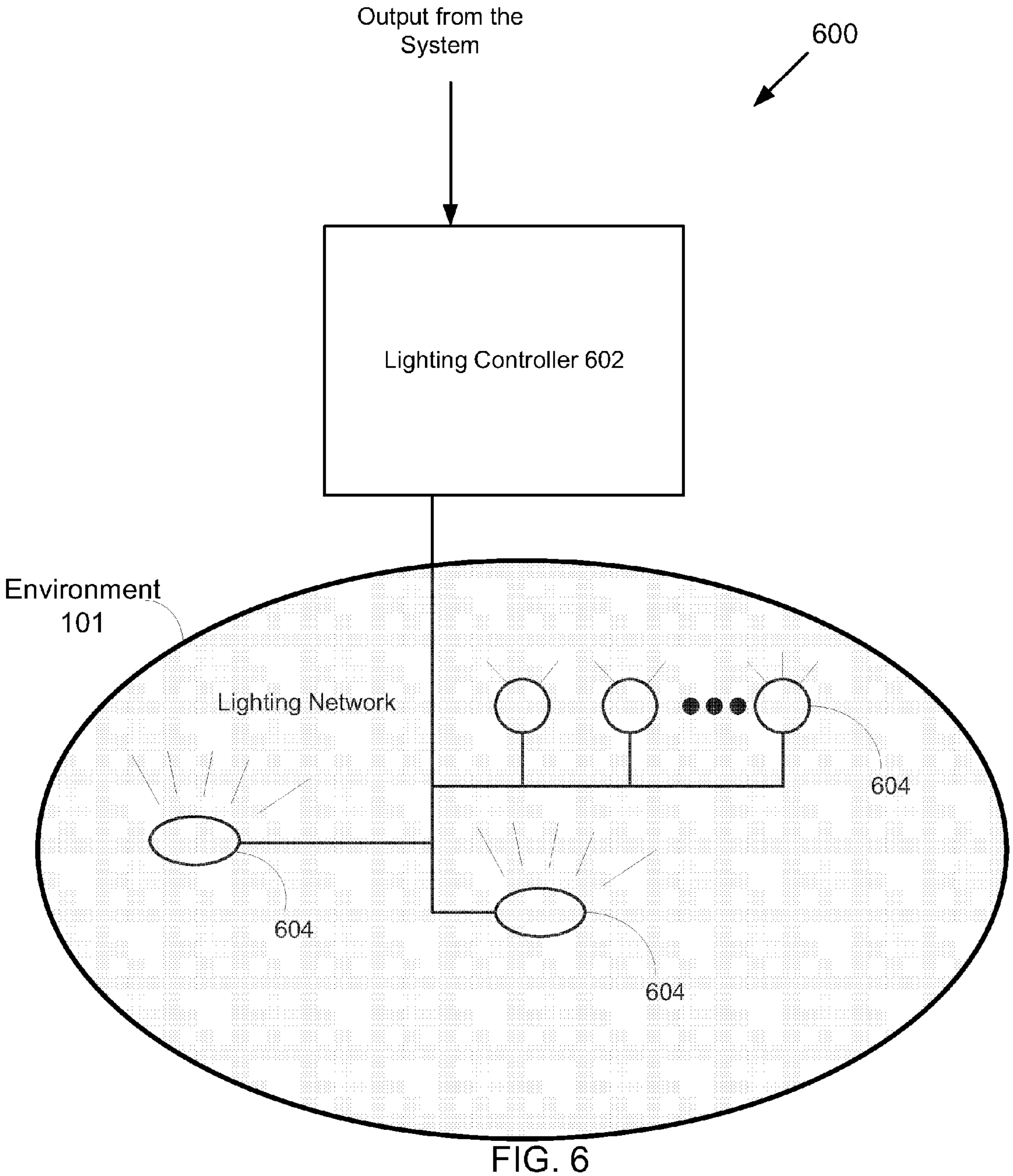
FIG. 6 illustrates a block diagram of a lighting network in accordance with one embodiment.

FIG. 6 illustrates one embodiment of a lighting network 600 according to various aspects of the present invention. In various embodiments, the network lighting system can include an additional lighting controller. As shown in FIG. 6, the control signals from a system, such as the system 500, can be provided to the additional lighting controller 602, which is configured to control a network lighting system. In various embodiments, the lighting controller 602 includes a software application, which can be used to create a lighting program, which may include one or more lighting sequences. The lighting controller 602 can execute or play back the lighting sequence described above and in response thereto, control one or more lighting units 604.

In certain embodiments, the lighting units 604 may be organized into different groups, e.g., to facilitate manipulation of a large number of lighting units. Lighting units 604 may be organized into groups based on spatial relationships, functional relationships, types of lighting units, or any other scheme determined by the controller. Spatial arrangements can be helpful for programming and carrying out lighting effects easily. For example, if a group of lights are arranged in a row and this information is provided to the system, the system can then implement effects such as a rainbow or a sequential flash. Any implementation or effects can be used on a group of units as well as on single lighting units. The use of groups can also allow the controller to transmit a single command or cue to control a predetermined selection of lighting units. The controller 602 may further control the lighting units 604 according to the sequence functions, the cue functions and the priority functions described above.

In certain embodiments, the outcome of one effect may be programmed to depend upon a second effect. For example, an effect assigned to a first lighting unit may be a random color effect, and an effect assigned to a second lighting unit may be designated to match the color of the random color effect. Alternatively, one lighting unit may be programmed to execute an effect, such as a Hashing effect, whenever a second lighting unit meets a certain condition, such as being turned off. Even more complex arrangements, such as an effect which is initiated upon a certain condition of a first effect, matches the color of a second effect and the rate of a third effect, can be created by this scheme. It can be appreciated that the above-described examples of combinations of effects or parameters being dependent upon other effects or parameters is provided merely for illustrative purposes, as the present invention is not limited to these specific examples, as numerous other dependencies and combinations are possible. It can be appreciated that the above-described lighting effects are generated based on the changing acoustic signals associated with the operation of the appliance as described above. The variation in the acoustic signals drives the dynamic nature of the lighting effects which can be perceived by the user.

In certain embodiments, a single component may be capable both of generating a control program and controlling the lighting units. For example, the controller described with reference to FIG. 5, can have software loaded thereon to enable it to perform not only the generation functions described above, but also the control or playback functions as being performed by the lighting controller, described with reference to FIG. 6. In certain embodiments, the functions described below as being performed by any software application alternatively may be provided by a hardware device, such as a chip or card, or any other system capable of performing the functions described herein.

In various embodiments of the present invention one or more acoustic signals can be received from multiple appliances. The multiples acoustic signals can be used to drive a common output by the system. The variation in the multiple acoustic signals can further enhance the variation in the output produced by the system, resulting in an output that is even more dynamic.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims in parentheses, if any, are provided merely for convenience and should not be construed as limiting in any way.

What is claimed is:

1. A system associated with an appliance, the system comprising:

one or more acoustic sensor associated with the appliance for receiving one or more acoustic signal within a soundscape that comprises any sound, and changing characteristic of the sound, associated with the appliance and a user's interaction with the appliance produced during any operating state, other than audio reproduction alone, thereof that includes any state, condition, or mode of operation of the appliance, the one or more acoustic sensor further for generating an associated output signal in response to the received acoustic signal or acoustic signals within the soundscape, wherein the any sound, and changing characteristic of the sound, of the soundscape comprises (i) sounds produced by the appliance itself, (ii) sounds produced as a result of the user interacting with the appliance, and (iii) combinations of sounds generated internal and external to the appliance;

one or more output element that comprise at least one output element remote from the appliance and configured to generate an output of various dynamic and non-repetitive output effects to be associated with the appliance and perceivable to at least the user located in an environment associated with the appliance; and a controller coupled to the one or more acoustic sensor and the one or more output element, the controller configured to:

receive the associated output signal; and control the one or more output element in response to the received associated output signal, wherein the one or more output element generates the output of the various dynamic and non-repetitive output effects to be associated with the appliance based on one or more feature of the received associated output signal.

2. The system of claim 1, wherein the output element is configured to provide feedback to a user of the appliance in the environment associated with the appliance.

3. The system of claim 1, wherein the one or more output element is configured to provide a pseudo-random decorative output in the environment associated with the appliance.

4. The system of claim 1, wherein the controller is further configured to control the one or more output element in response to the received associated output signal to generate a varied output based on differences in at least one of how the appliance is used and an operating condition of the appliance.

5. The system of claim 1, wherein the output includes at least one of light, sound, and vibration.

6. The system of claim 1, wherein the one or more output element is disposed apart from the appliance, and wherein the one or more output element is integrated into at least one of a system that provides ambient lighting in the environment associated with the appliance, a system that provides decorative lighting in the environment associated with the appliance and an audio system that provides a set of sound signals audible in the environment associated with the appliance.

7. The system of claim 1, wherein the one or more output element comprises at least one of a speaker system, a visual display system, and a tactile feedback system.

8. The system of claim 1, further comprising a memory configured to store a pre-programmed output, wherein the controller is further configured to control the one or more output element in response to the pre-programmed output.

9. The system of claim 1, wherein the one or more output element comprises a lighting network configured to produce a lighting effect perceivable in the environment.

10. The system of claim 9, wherein the controller is further configured to control at least one of an intensity, a duration, a color, and timing of the lighting effect based on the received associated output signal.

11. The system of claim 9, wherein the controller is further configured to control the lighting network to provide the lighting effect based on a characteristic of the received associated output signal including at least one of a frequency of the received associated output signal, a sound pressure level of the received associated output signal, a relative change of the sound pressure level, a deviation of the received associated output signal, and acoustic patterns associated with the appliance.

12. The system of claim 1, wherein the controller is further configured to identify a specific user of the appliance in response to performing a pattern recognition algorithm on the associated output signal generated by the one or more acoustic sensor.

13. The system of claim 12, wherein the controller is further configured to control the one or more output element to generate the output personalized to the identified user.

14. A household appliance comprising:

at least one output element included in the household appliance and at least one output element remote from the household appliance, each of the at least one output element configured to generate an output of various dynamic and non-repetitive output effects to be associated with the household appliance and perceivable to at least the user located in an environment associated with the household appliance;

one or more acoustic sensor configured to receive one or more acoustic signal within a soundscape that comprises any sound, and changing characteristic of the sound, associated with the household appliance and a user's interaction with the household appliance produced during any operating state, other than audio reproduction alone, of the household appliance that includes any state, condition, or mode of operation of the appliance, the one or more acoustic sensor further configured to generate an associated output signal in response to the received acoustic signal or acoustic signals within the soundscape, wherein the any sound, and changing characteristic of the sound, of the soundscape comprises (i) sounds produced by the household appliance itself, (ii) sounds produced as a result of the user interacting with the household appliance, and (iii) combinations of sounds generated internal and external to the household appliance; and a controller coupled to the one or more acoustic sensor and to the at least one output element included in the household appliance and the at least one output element remote from the household appliance, and configured to:

receive the associated output signal; and control the at least one output element included in the household appliance and the at least one output element remote from the household appliance in response to the received associated output signal, wherein the at least one output element included in the household appliance and the at least one output element remote from the household appliance generate the output of the various dynamic and non-repetitive output effects to be associated with the household appliance based on one or more feature of the received associated output signal, such that the output provides feedback to a user of the household appliance in the environment associated with the household appliance.

15. The household appliance of claim 14, wherein the output includes a pseudo-random and multi-modal output.

16. The household appliance of claim 14, wherein the controller is further configured to control the at least one output element included in the household appliance and the at least one output element remote from the household appliance in response to the received associated output signal to generate a varied output based on differences in at least one of how the household appliance is used and an operating condition of the household appliance.

17. The household appliance of claim 14, further comprising at least one output element disposed apart from the household appliance, wherein the controller is further configured to communicate with the at least one output element disposed apart from the household appliance, and wherein the at least one output element disposed apart from the household appliance is integrated into at least one of a system that provides ambient lighting in the environment associated with the household appliance, a system that provides decorative lighting in the environment associated with the household appliance and an audio system that is audible in the environment associated with the household appliance.

18. The household appliance of claim 14, wherein at least one output element comprises at least one of a speaker system, a visual display system, and a tactile feedback system.

19. The household appliance of claim 14, wherein at least one output element comprises a lighting network configured to produce a lighting effect perceivable in the environment, and wherein the controller is further configured to control at least one of an intensity, a duration, a color, and a timing of the lighting effect based on the received associated output signal.

20. The household appliance of claim 19, wherein the controller is further configured to control the lighting network to provide the lighting effect based on a characteristic of the received associated output signal including at least one of a frequency of the received associated output signal, a sound pressure level of the received associated output signal, a relative change of the sound pressure level, a deviation of the received associated output signal, and acoustic patterns associated with the household appliance.

21. The household appliance of claim 14, wherein the household appliance comprises one selected from a group consisting of: a toaster, a toaster oven, a stove, a vacuum cleaner, a kettle, a coffee grinder, a coffee maker, a washing machine, a dryer, a food processor, a blender, a mixer, a heating ventilation and air conditioning (HVAC) system, a grill, a copy machine, a fax machine, a printer, and a power tool.

22. A method of producing an output associated with an appliance, the method comprising:

receiving, via one or more acoustic sensor, one or more acoustic signal associated with the appliance within a soundscape that comprises any sound, and changing characteristic of the sound, associated with the appliance and a user's interaction with the appliance produced during any operating state, other than audio reproduction alone, of the appliance that includes any state, condition, or mode of operation of the appliance, the one or more acoustic sensor generating an associated output signal in response to the received acoustic signal or acoustic signals within the soundscape, wherein the any sound, and changing characteristic of the sound, of the soundscape comprises (i) sounds produced by the appliance itself, (ii) sounds produced as a result of the user interacting with the appliance, and (iii) combinations of sounds generated internal and external to the appliance;

providing one or more output element that comprise at least one output element remote from the appliance and configured to generate an output of various dynamic and non-repetitive output effects to be associated with the appliance and perceivable to at least the user located in an environment associated with the appliance;

controlling, via a controller, the one or more output element in response to a received associated output signal, wherein the one or more output element generates the output of the various dynamic and non-repetitive output effects to be associated with the appliance based on one or more features of the received acoustic signal, the output generated in the environment associated with the appliance; and varying the output based on differences in the one or more acoustic signal resulting from a change in the operating state of the appliance.

23. The method of claim 22, wherein receiving the one or more acoustic signal further comprises:

receiving a first acoustic signal corresponding to a first operating state of the appliance; and receiving a second acoustic signal corresponding to a second operating state of the appliance, the second operating state being different than the first operating state.

24. The method of claim 23, wherein controlling the one or more output element further comprises:

controlling the one or more output element to provide a first output corresponding to the first operating state of the appliance; and controlling the one or more output element to provide a second output based on the second acoustic signal corresponding to the second operating state of the appliance, wherein the second output is different than the first output.

25. The method of claim 24, wherein the change from the first operating state to the second operating state occurs independently of a user's operation of the appliance.

26. The method of claim 24, wherein the change in the operating state from the first operating state to the second operating state results from a user operating the appliance.

27. The method of claim 22, wherein varying the output based on differences in the one or more acoustic signal further comprises varying the output based on differences in the one or more acoustic signal to provide a pseudo-random output.

28. The method of claim 22, wherein controlling the one or more output element to provide the output further comprises controlling the one or more output element to provide feedback to a user in the environment associated with the appliance, wherein the feedback to the user results in the user operating the appliance to change the operating state.

* * * * *